United States Patent [19]

Irby et al.

[11] Patent Number: 4,750,783
[45] Date of Patent: Jun. 14, 1988

[54] COACTING INFANT/TODDLER SEAT/CAR SEAT/STROLLER SYSTEM

[76] Inventors: Samuel S. Irby; Gay J. Irby, both of 514 E. Atlantic St., South Hill, Va. 23970

[21] Appl. No.: 898,355

[22] Filed: Aug. 20, 1986

[51] Int. Cl.$^4$ .............................................. A47D 1/10
[52] U.S. Cl. .................................... 297/250; 297/130; 297/377
[58] Field of Search ............... 297/130, 134, 250, 254, 297/377, 464

[56] References Cited

U.S. PATENT DOCUMENTS

| | | |
|---|---|---|
| 2,779,389 | 1/1957 | Pearl ................. 297/134 X |
| 3,206,247 | 9/1964 | Johnson . |
| 3,272,566 | 9/1966 | Rocker . |
| 3,290,050 | 12/1966 | Ezquerra ................. 297/377 |
| 3,351,380 | 11/1967 | Sprague . |
| 3,528,701 | 9/1970 | Laughlin . |
| 3,574,485 | 12/1970 | Peterson ................. 297/377 |
| 3,649,074 | 3/1972 | McDonald et al. ........... 297/130 X |
| 3,858,936 | 1/1975 | Gerken . |
| 4,113,306 | 9/1978 | Von Wimmersperg . |

FOREIGN PATENT DOCUMENTS

| | | |
|---|---|---|
| 2343679 | 3/1975 | Fed. Rep. of Germany ...... 297/377 |
| 560531 | 4/1975 | Switzerland ........................ 297/250 |
| 1512370 | 6/1978 | United Kingdom ................ 297/250 |

*Primary Examiner*—Kenneth J. Dorner
*Assistant Examiner*—Peter R. Brown
*Attorney, Agent, or Firm*—John F. McClellan, Sr.

[57] ABSTRACT

A system for supporting an infant in different modes of use includes co-acting infant carrier by which an infant can be carried in arms or supported on a surface at a selected angle, an infant/toddler car seat into which the carrier with the infant can be snapped in place quickly for auto travel and as quickly removed, using only one hand, and a stroller into which the carrier can be inserted and attached for rolling transport.

5 Claims, 3 Drawing Sheets

COACTING INFANT/TODDLER SEAT/CAR SEAT/STROLLER SYSTEM

FIELD OF THE INVENTION

This invention relates genrally to supports and particularly to supportive seat mechanisms for infants and toddlers.

BACKGROUND OF THE INVENTION

In the known art are various seats, many of them are usable in automobiles.

The following U.S. patents are noted:

U.S. Pat. No. 4,113,306 issued to H. F. Von Wimmersperg on 9-12-78 showed infant seat mechanism usable as both a vehicle safety restraint and as a stroller;

U.S. Pat. No. 3,858,936 issued to D. L. Gerken on 1-7-75 showed one of many types of infant seats or carriers with safety belts and angle adjustment;

U.S. Pat. No. 3,528,701 issued to C. A. Laughlin on 9-15-70 showed an infant carrier with provision for releasably anchoring it to a vehicle seat;

U.S. Pat. No. 3,351,380 issued to R. P. Sprague on 11-7-67 showed an infant carrier detachably affixable to a carriage (shopping cart);

U.S. Pat. No. 3,272,566 issued to E. Rocker on 9-13-66 showed another form of adjustable carrier;

U.S. Pat. No. 3,206,247 issued to L. W. Johnson on 9-14-84 showed a form of angle-adjustable infant seat adapted to hold on the back of a car seat.

However, no system is believed to be available that provides the advantages of the present invention according to the objects thereof.

SUMMARY OF THE INVENTION

A principal object of this invention is to provide a system that permits an infant by means of an infant carrier to be conveniently and quickly and securely and comfortably attached to either an infant/toddler car seat installed in an automobile or to an infant/toddler stroller, without need to reorient or reposition the infant in the infant carrier.

Further objects are to provide a system as described that is economical and has multi-uses in that any of the three co-acting elements, carrier, car seat or stroller can, in proper circumstances, be used alone.

And further objects are to provide the three co-acting elements for easy purchase and use until the child is old enough to be buckled safely in a regular seat belt (an exemplary State law requires that a child must be either four years old or weigh forty pounds before it can be buckled in a regular seat belt. Otherwise it must be in a car seat).

Still further objects are to provide a system as described that has a provision for quiet, simultaneous one-hand locking and unlocking of an infant/toddler car seat, that is light in weight and strong and safe but not unduly bulky.

For purposes of this disclosure, the infant carrier of this invention may be termed an insert, in that it inserts into either of the other two elements of the system. Further, wherever "car seat" or "infant car seat" is mentioned, it is to be understood that "infant or toddler" car seat is meant for the purposes of this disclosure, including the claims.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
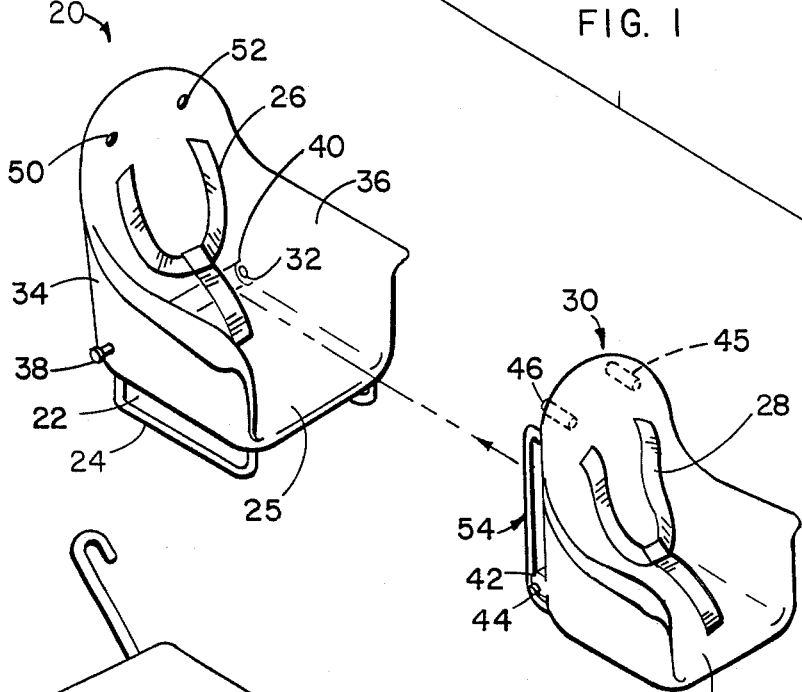
FIG. 1 is a fragmentary exploded perspective view showing the relation between an infant carrier and a car-seat, according to this invention.

FIG. 1 shows an infant car seat 20 (usable by infant pre-toddler or toddler, as noted) of a type that has an opening 22 beneath, formed by looped legs 24 protruding from the bottom of the seat 25 for passage of an automobile seat belt (not shown) that detachably affixes the car seat 20 to a seat of an automobile.

This showing is diagrammatical and may differ in detail without affecting the spirit of the invention, various suitable car seats being usable.

The car seat preferably has a conventional seat belt 26 of its own, and may be used independently of the invention for infants or toddlers. However, in such case an infant would have to be disturbed to put it into and to remove it from the car seat 20.

The invention provides means, however, for preventing disturbance of an infant being secured to or removed from the car seat.

For this, the infant is secured by means of a conventional safety belt 28 in infant carrier 30 on the seat 31 thereof. The infant may be asleep or otherwise tranquil and is unlikely to be disturbed when the infant-carrier 30 is carried to and secured to the car seat 20 (arrow).

In this procedure, unnecessary and undesirable fumbling with fasteners is avoided by the invention. The infant carrier 30 simply snaps into place in the car seat 20, both sides of each one being secured to the other.

In accordance with a further provision of this invention, one-point finger pressure releases both sides of the infant carrier, when desired, from the car-seat, leaving one hand free to stabilize the infant and infant carrier. The provision is substantially symmetrical and can be operated from either side.

Details making the one-point release possible are conventional and will be described further later. The invention lies in use of a one-point release of a two-side securance of infant carrier to car seat, and in location of same, not in the details of the mechanism. Visible in this figure are portions of the provision. A respective hole 32, shown, is provided in the lower sidewall of the car seat at the junction of the preferably continuous back 34 with the preferably continuous arm 36.

The holes face each other. Each hole has on the outside of the car seat a plunger 38 shown, to pass from outside-in in the hole when pressed, and on the inside a concave conical or funnel-like entrance 40, shown.

The infant carrier 30 has, contained in a molded portion 42 across the lower rear, a pair of spring-extended, coaxial, linked latches 44, laterally protrusive part shown, that snap into the holes 32 when the infant carrier 30 is pressed back into the car seat 20, fixing it to the car seat.

To release the infant carrier 30 from the car seat 20, either plunger, 38 shown, is pressed.

Strength and stability of the intimate fit of the joined car seat 20 and infant carrier 30 will be evident.

For guiding and further stabilizing the infant carrier 30 a pair of laterally spaced rounded projections or protrusions 45, 46 may project rearwardly from the upper back portion of the infant carrier and fit into mating apertures 50, 52 in the car seat 20; the fit is preferably latch-free for free reception and release, in accordance with the one-point provision for attachment and release provision of this invention.

The infant carrier 30 can be used alone as indicated, and for this a rearward incline or tilt-adjustment mechanism 54 is provided on the back, a portion of which is visible here. This is described later.

Figure 2:
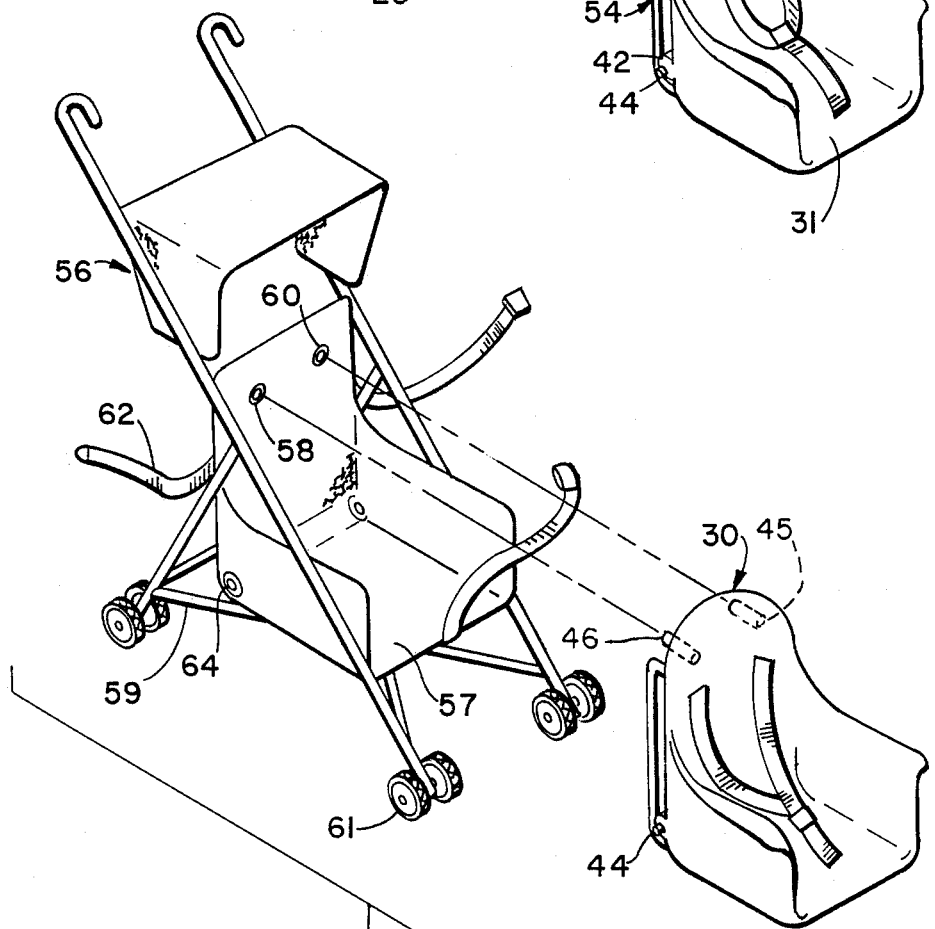
FIG. 2 is an exploded view showing the relation between the infant carrier of FIG. 1 and a stroller.

FIG. 2 shows the analogous nesting relation of the infant carrier 30 fit into the stroller 56 of this invention, onto the seat 57 of which the infant carrier with infant safely buckled in it can be inserted, or if desired, the infant carrier may first be installed and then an infant buckled in place. The protrusions 46,45 on the back of the infant carrier 30 fit through respective apertures in grommets 58, 60 in the back of the stroller 56 when the infant carrier is installed in it. As with the car seat, preferably the protrusions have no latching provision. The safety belt 62 of the stroller 56 is then buckled around the infant carrier 30. A latch 44 or equivalent lateral protrusion on the infant carrier 30 may protrude freely through a corresponding aperture of laterally located grommet 64 on each of the sides of the stroller for better securance. The stroller is preferably of the conventional folding type so that when the stroller is used alone, the canvas seat 57 and frame 59 can compactly collapse. Eight wheels 61 are preferred, Loading forces on the stroller with the carrier in place are low and uniform.

Figure 3:
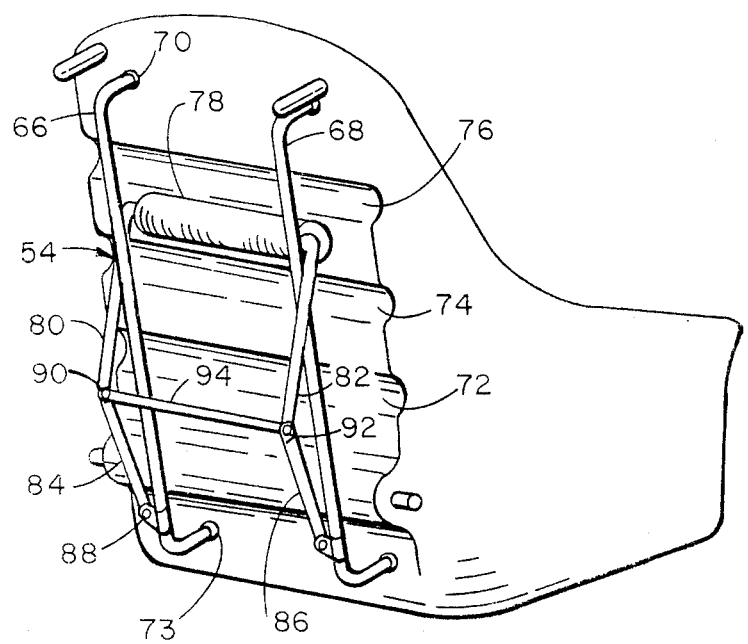
FIG. 3 is a rear perspective view of the infant carrier of FIG. 1.

FIG. 3 shows a folding incline mechanism 54 on the back of the infant carrier for tilt-adjustment when the infant carrier is used alone.

First and second laterally-spaced resilient upright rails 66, 68 have ends fixed top and bottom as at 70, 73 to the back of the infant carrier. Three cross grooves 72, 74, 76 are molded into the back of the infant carrier parallel with each other and transverse to the rails. The rails force into any desired groove a transverse member 78, which may be a roller, constrained to move up or down by a linkage. The linkage includes on each side an upper link 80, 82 connected to the ends of the transverse member, a lower link 84, 86 pivotally fixed as at 88 to a lower portion of a respective resilient upright rail, and a hinge joint 90, 92 connecting each lower link 84, 86 with an upper link 80, 82. A brace 94 laterally connects the hinge joints. In operation, the position, in a particular groove, of this transverse member 78 sets the angle of incline resting back on a floor or bed of the mechanism, providing tilt adjustment but folding flat for installation of the infant carrier 30 into the car seat 20 or the stroller 56, when desired.

Figure 4:
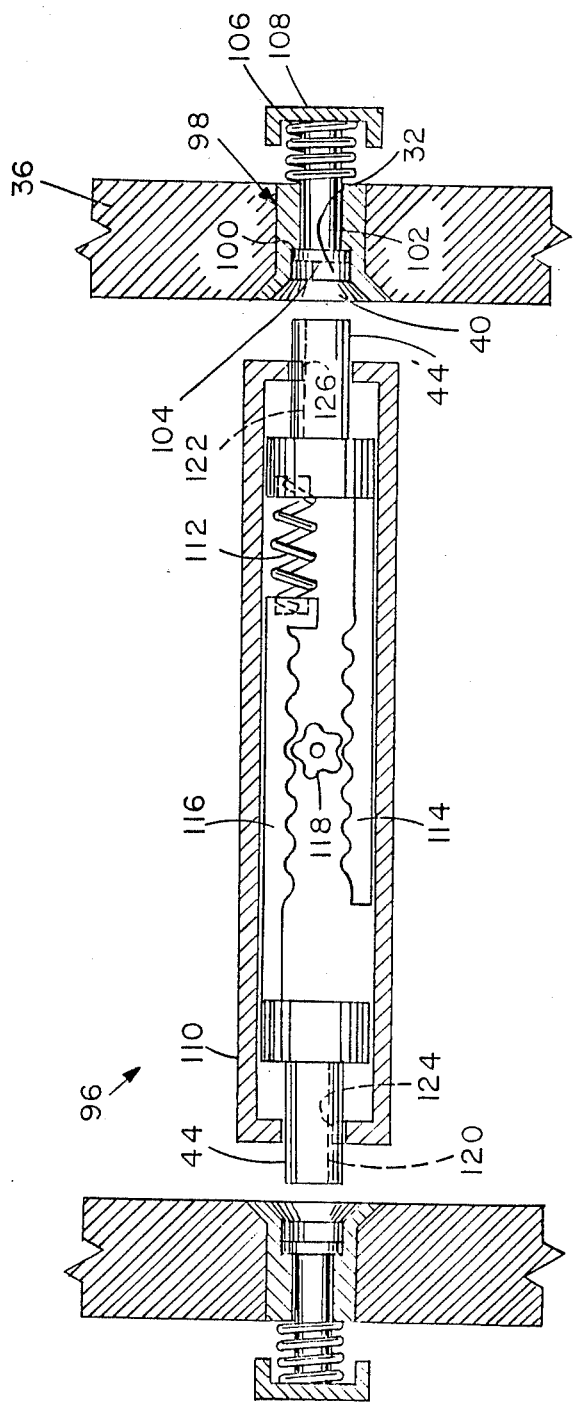
FIG. 4 is a partially sectional diagram of an exemplary old-art one-point release that may be used in this invention.

FIG. 4 shows a conventional one-point (either side) release, latch mechanism 96 that may be used with the system of this invention.

The mechanism is shown partially compressed, for exposition.

The car seat has on each side, coaxially facing each other a socket assembly 98 with an inward-facing conical entrance 40, a cylindrical passage 32 with a shoulder 100 and a plunger 102 with a flanged end 104 in the passage resting against the shoulder and biased outward by a compression spring 106 under an end cap 108, on the outside.

A tube 110 with a plunger latch 44, 44' slidably protruding coaxially from each end is held in a molded portion in the back of the infant carrier, or otherwise clamped in place. An internal spring 112 compressed between portions of the plunger latches urges the plunger latches to protrude and engage the respective cylindrical passages 32. Pressing on either of the end caps 108 at the ends of the tube, retracts both plunger latches by means of a respective rack 114, 116 integral with each plunger latch and inwardly engaging a pinion 118 pivotally mounted in the tube between an overlap of the racks. A keyway 120, 122 and key portion 124, 126 of the tube at each end prevents rotation of the plunger latches as they snap-in-place or retract.

Other mechanisms that will do for the purpose include station wagon rear seat latching systems that release both sides of a seat by actuation at either end.

The carrier and car seat may be of any suitable thermoplastic or metal, furthering the economy of this three piece coacting set.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for infant support, including toddler-size infant support, comprising: a carrier for an infant, a car seat for an infant, including a toddler-size infant, a stroller for an infant including a toddler-size infant, each of said carrier, car seat and stroller having a seat portion, means for detachably attaching the carrier to the car seat and means for detachably attaching the carrier to the stroller, whereby said car seat and stroller may be used respectively with the carrier or without the carrier, the means for detachably attaching the carrier to the car seat comprising snap-in-place latching means for engaging the carrier to the car seat, means on the carrier providing adjustable tilt-back of the carrier, the means on the carrier having provision for folding flat when not in use to provide tilt-back, said provision for folding flat permitting the carrier to nest in the car seat or in the stroller selectively as desired, for said detachable attachment, the carrier having a back, the means on the carrier providing adjustable tilt-back being on the back of the carrier and comprising first and second laterally spaced resilient upright rails, each laterally spaced resilient upright rail having a top end and a bottom end fixed to the back of the carrier, structure defining a plurality of grooves across the back of the carrier transverse to the upright rails, a transverse member and a linkage pivoted to the back of the carrier and at said upright rails and constraining the transverse member for movement up or down along the upright rails and for fitting of the transverse member into and retention in a selected one of said plurality of grooves, thereby providing said adjustable tilt-back, the means for detachably attaching the carrier to the car seat including structure projecting rearwardly from the carrier at an upper portion thereof, and socket-defining structure on the car seat for freely receiving and freely releasing said rearwardly projecting structure.

2. A system as recited in claim 1, the stroller having a back portion with aperture-defining structure proportioned for freely receiving and freely releasing said rearwardly projecting structure.

3. A system as recited in claim 1, structure defining a lateral aperture on each side of the stroller seat portion, and a respective laterally protrusive part on each side of the carrier for fitting into a said lateral aperture and holding the carrier.

4. A system for infant support, including toddler-size infant support, comprising: a carrier for an infant, a car seat for an infant, including a toddler-size infant, a stroller for an infant including a toddler-size infant, each of said carrier, car seat and stroller having a seat portion, means for detachably the carrier to the car seat and means for detachably attaching the carrier to the stroller whereby said car seat and stroller may be used respectively with the carrier or without the carrier, the means for detachably attaching the carrier to the car seat comprising snap-in-place latching means for engaging the carrier to the car seat, means on the carrier providing adjustable tilt-back of the carrier, the means on the carrier having provision for folding flat when not in use to provide tilt-back, said provision for folding flat permitting the carrier to nest in the car seat or in the stroller selectively as desired, for said detachable attachment, the carrier having a back, the means for detachably attaching further comprising structure defining a pair of holes in the car seat and a pair of holes in the stroller, and a pair of projections from the back of the carrier located for engaging the pair of holes in the car seat and the pair of holes in the stroller, when the car seat is nested therein respectively.

5. A system for infant support, including toddler-size infant support, comprising: a carrier for an infant, a car seat for an infant, including a toddler-size infant, each of said carrier, car seat and stroller having a seat portion, means for detachably attaching the carrier to the car seat and means for detachably attaching the carrier to the stroller, whereby said car seat and stroller may be used respectively with the carrier or without the carrier, the means for detachably attaching the carrier to the car seat comprising latching means for engaging the carrier to the car seat, means on the carrier providing adjustable tilt-back of the carrier, the means on the carrier having provision for folding flat when not in use to providing tiltback, said provision for folding flat permitting the carrier to nest in the car seat or in the stroller selectively as desired, for said detachable attachment, and the means for detachably attaching the carrier to the car seat including structure projecting rearwardly from the carrier at an upper portion thereof, and socket defining structure on the car seat for freely receiving and freely releasing said rearwardly projecting structure.

* * * * *